F. M. ENGLISH.
Detaching Horses.
No. 11,023.  Patented June 6, 1854.
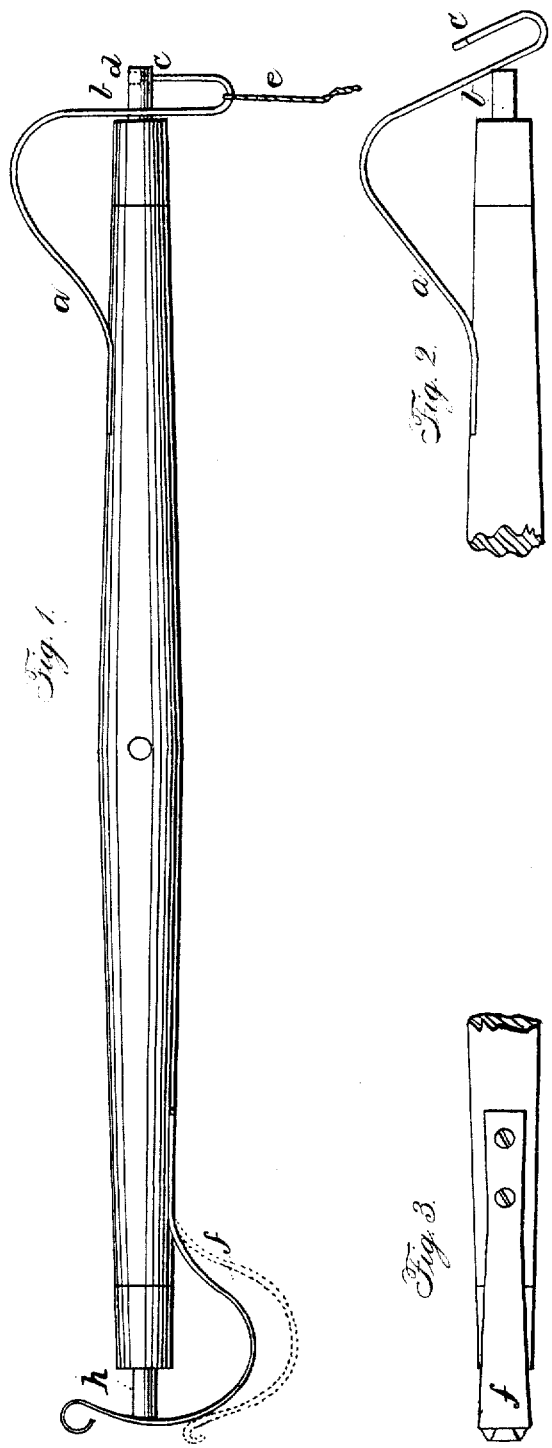

UNITED STATES PATENT OFFICE.

FRANCIS M. ENGLISH, OF HOPKINSVILLE, KENTUCKY.

WHIFFLETREE.

Specification of Letters Patent No. 11,023, dated June 6, 1854.

*To all whom it may concern:*

Be it known that I, FRANCIS M. ENGLISH, of Hopkinsville, in the county of Christian and State of Kentucky, have invented a new and Improved Mode of Disconnecting Vehicles from the Power Drawing Them; and I do hereby declare that the following is a full, clear, and exact description thereof, reference being had to the annexed drawings, forming part of this specification, in which—

Figure 1 is a plan of swingle tree with improved disconnector attached. Fig. 2 is a plan of pin end of swingle tree with pin removed and spring expanded. Fig. 3 is a rear view of end of swingle tree showing width of spring.

Similar letters of reference denote the same part.

The nature of my invention consists in providing a spring which I attach to a swingle tree of any form and material at a suitable distance from its end, which spring passes around the end of the swingle tree and is provided with an aperture through it, to admit of the passage of the dart of the swingle tree. The spring is placed upon the dart with the trace upon it, both secured in their position by a detached key or key attached to the spring, as may be preferred.

To effect a disconnection the key is withdrawn which sets free the action of the spring when the trace thereby is thrown from the dart, and the disconnection is effected. The key is withdrawn by means of a string or wire attached to it leading to the driver in any manner preferred.

To enable others skilled in the art to make and use my invention I will proceed to describe its construction and operation.

I provide a flat curved spring $a$ one end of which is fastened by means of screws or otherwise to the swingle tree at a sufficient distance from its end to permit the spring to pass in a curve from its fastening out over and beyond the dart $b$ in the swingle tree; said spring having through it an opening at the proper point to admit the passage of the dart when the spring is drawn upon it. The spring is first placed upon the dart with the trace against it, and both spring and trace held to their place by means of a key $c$ on the end of the spring $a$ passing through an aperture $d$ in the outer end of the dart $b$. The key is connected with the driver by means of a string or wire $e$ which enables him to draw it at will and when drawn, gives the spring its full action to throw or force the trace from the dart which effects a disconnection of the drawing power from the vehicle. The key $c$ is metal and is attached to the spring $a$ which is placed on the front side of the swingle tree. The key is placed in position by extending the free end of the spring $a$ sufficient length to pass behind the end of the trace, and bending around its end passes parallel to the trace until it enters the orifice $d$ in the dart $b$. If the spring is fastened to the after side of the swingle tree the key may be connected to the spring by screws or rivets at the point on the spring which will permit it to pass as above described to its confining position in the dart.

If the spring be placed on the top or bottom part of the swingle tree the key may be used in any of the above specified modes. I also use on the opposite end of the swingle tree a spring $f$, without a key, to confine the trace when but one end of the swingle tree is used with the attachment of the first mentioned spring and key. I use the spring $f$ as a key by fastening it to the swingle tree at a sufficient distance from the end to permit it to pass in a curved form around the end of the swingle tree so as to rest on the end of the dart which when the first described spring $a$ has thrown the trace from the dart leaves this end to pass forward by the force drawing, until the trace bears against the spring $f$ with such force and in such manner as to permit the trace to pass from the dart $h$ effecting thereby a complete disconnection between the vehicle and the horse.

What I claim as my invention and desire to secure by Letters Patent, is—

The herein described arrangement of springs on the ends of swingle trees for holding the traces on the darts, and throwing off the same at the will of the driver, as herein fully set forth.

In testimony whereof, I have herein signed my name before two subscribing witnesses.

FRANCIS M. ENGLISH.

Witnesses:
S. M. BEMARD,
JOHN M. MICKS.